United States Patent [19]

Poehler et al.

[11] 4,311,370
[45] Jan. 19, 1982

[54] FILM READER

[76] Inventors: Hermann Poehler, Taunusstr. 11, 6352 Ober-Mörlen; Peter Dziemba, Ahornweg 17, 6351 Wisselsheim, both of Fed. Rep. of Germany

[21] Appl. No.: 92,427

[22] Filed: Nov. 7, 1979

[30] Foreign Application Priority Data

Jun. 28, 1979 [DE] Fed. Rep. of Germany ....... 2926059

[51] Int. Cl.³ .................... G03B 21/00; G03B 23/00
[52] U.S. Cl. ................................. 353/27 R; 33/1 M; 353/95
[58] Field of Search ............... 353/27 R, 95, 96; 33/1 M

[56] References Cited

U.S. PATENT DOCUMENTS

| 2,501,453 | 3/1950 | Rowe et al. | 353/27 R |
| 3,442,581 | 5/1969 | Smitzer et al. | 353/27 R |
| 3,472,585 | 10/1969 | Halberg et al. | 353/27 R |
| 3,797,925 | 3/1974 | Smitzer | 353/27 R |
| 3,838,916 | 10/1974 | Gawin et al. | 353/27 R |

Primary Examiner—Steven L. Stephan
Attorney, Agent, or Firm—Michael J. Striker

[57] ABSTRACT

The film reader has a substantially cubic housing one wall of which is formed with a projection screen, an intake slot for a film to be projected, a focus control knob and two slots for position control levers movable along mutually normal axes near the screen. The transmission means between a film holder and respective control levers include a longitudinal carriage movable on two guiding tracks along one axis and supporting a transverse carriage for a transverse movement along the other axis. Each lever is pivotable about a fixed pivot point in mutually normal planes and is provided with an equalizing lever cooperating with a pin and slot guide. One control lever has an equalizing elbow lever hinged to a transmission lever extending transversely to the control lever and coupled to one side of the longitudinal carriage. The other control lever is coupled to the transverse carriage which supports the film by means of a closed loop Bowden wire.

2 Claims, 6 Drawing Figures

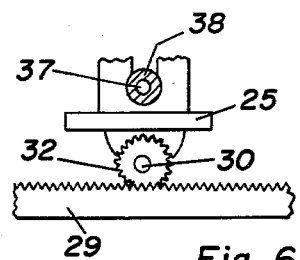
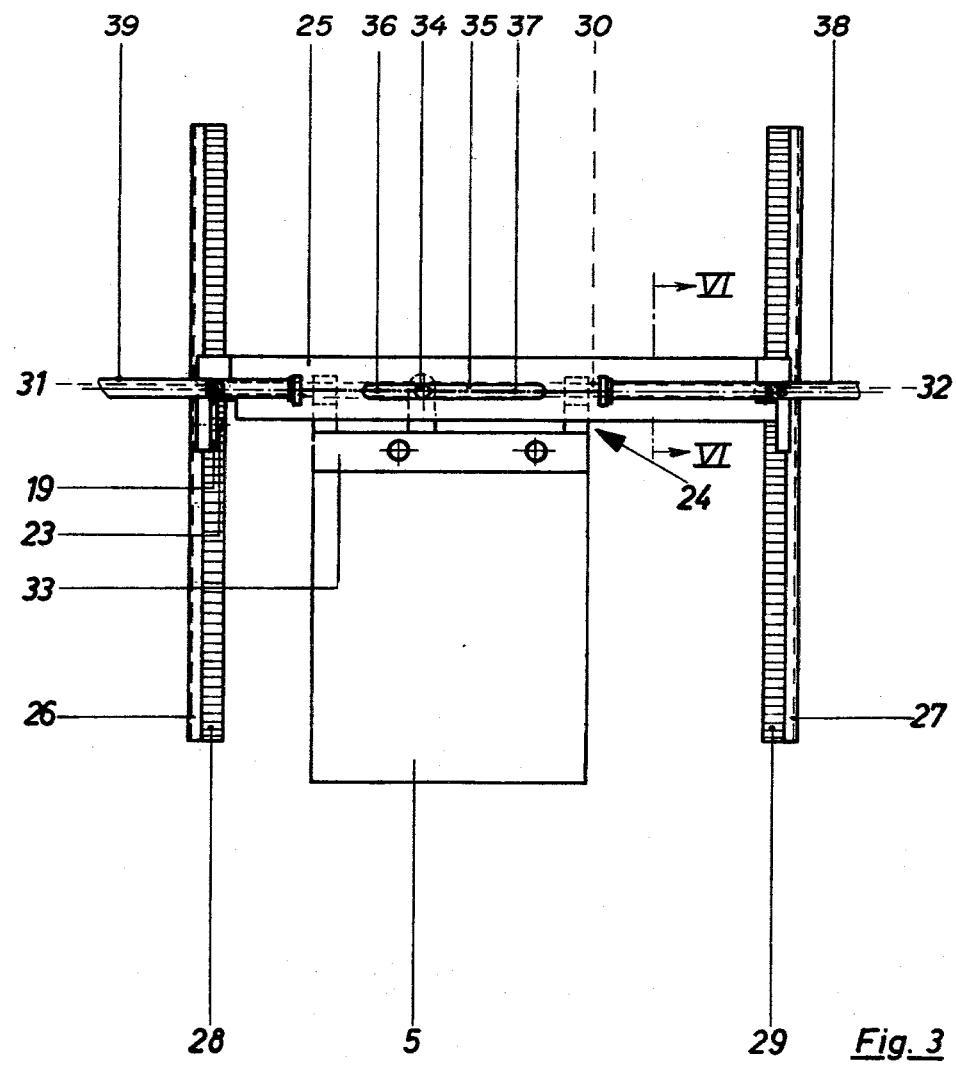
Fig. 6
Fig. 3

FILM READER

BACKGROUND OF THE INVENTION

This invention relates generally to a film reader and, more particularly, it relates to a film reader which has a projector enclosed in a housing to project at least a portion of a film on the screen, and a film holder which is supported on a slide carriage which in turn is supported on a transverse slide carriage for movement in the illumination plane of the projector.

In conventional film readers of this type the operator directly displaces the film holder in two directions in order to place the desired film portion to be projected in front of the objective in the film reader. Such direct actuation of the film holder, however, has the disadvantage that a fine position adjustment of the film is difficult especially in the case when the film is a microfilm, the projected portions of which are very small and require a considerable magnification. Another disadvantage of the known film readers having a projector located laterally to the screen is in the fact that the film has to be shifted in an opposite direction than that which is desired on the screen. This condition has the consequence that in practice even experienced operators frequently make errors in the correct positioning of the projected image resulting in time losses.

SUMMARY OF THE INVENTION

It is therefore a general object of the present invention to overcome the aforementioned disadvantages.

More particularly it is an object of the invention to provide an improved film reader of the aforedescribed type which enables a sensitive position adjustment and selection of the projected image while moving the projected image on the screen in the same sense as is moved the corresponding control member.

In keeping with these objects, and others which will become apparent hereafter, one feature of the invention resides in a film reader having a film holder which is supported on a transverse sliding carriage which in turn is supported for a longitudinal movement on an elongated carriage, in the provision of two control levers extending respectively through the film reader, one of the levers being movable in one direction and the other lever being movable in transverse direction, and transmission means linked between the control levers and the film holder to move in a converted way, the film holder in the illuminating plane of the projector along two mutually normal axes. By virtue of the conversion of the movement of the control levers via the transmission means, the path of movement of the end of each control lever is extended relative to the movement of respective carriages of the film holder. As a result even extremely small portions of the projected film can be adjusted accurately on the screen in the desired position. The extension of the path of movement of respective control levers of the film reader also enables a resetting operation by providing a series of indexing marks can be applied along each slot in the film reader housing through which a control lever projects. The transmission means of this invention further enables a very sensitive control and prevent an override of the film relative to the objective of the projector, caused by the unavoidable jerk upon overcoming the static friction at the beginning of the operation.

Each control lever is, at its other end inside the reader housing pivotably supported on a fixed pivot pin by which it is also guided in an oblong slot extending in its longitudinal direction. The transmission means further includes an equalizing lever pivotably connected between the housing and the assigned control lever to convert the circular movement of the free end of the control lever into a substantially rectilinear movement along the wall of the housing. At the same time the control lever performs translational movement along its guiding slot and in this manner the control knob keeps a substantially uniform clearance from the wall of the housing.

In the preferred embodiment the control lever for the horizontal displacemnt of the projected image is coupled via the transmission means to the elongated carriage of the film holder and is swingable in a plane perpendicular to the illumination plane of the projector. In this preferred embodiment the equalizing lever is in the form of an angular lever the apex of which is hinged to the film reader housing, one arm of which is linked to the horizontal control lever and the other arm being hinged to a transmission lever. The transmission lever is pivotably supported for movement in the plane of the horizontal control lever and is linked to the longitudinal carriage of the film holder. The pivot pins linking one end of the transport lever to the housing and the other end of the lever to the longitudinal slide carriage of the film holder also cooperate, respectively, with guiding slots which enable the longitudinal displacement of the transport lever. This pin-slot guiding arrangement enables in a very simple manner a uniform transmission ratio and the reversal of direction of movement between the control lever and the film holder. If, for instance, the horizontal control lever is displaced in the direction towards the film holder, the latter is moving away from the screen toward the interior of the housing. In this manner it is attained a unidirectional movement of the control lever and of the projected image.

The equalization of movement due to the slot-pin guiding means has the advantage in the provision of a uniform transmission ratio over the entire range of movement of the horizontal control lever, the linking transmission lever and of the longitudinal carriage for supporting the film holder. This transmission assembly is mechanically very simple and is composed of a few parts only. As a consequence, it is inexpensive in manufacture and has a negligible play in its hinge joints.

In a further elaboration of this invention, the longitudinal carriage of the film holder is guided in two parallel tracks each being provided with a gear rack, the longitudinal carriage extending between the two tracks and supporting for rotation a driving shaft which in turn is provided at its ends with driving pinions engaging the tracks and the free end of the transmission lever being hinged to the longitudinal carriage in the range of one of the guiding tracks.

This guiding arrangement has the advantage that the longitudinal carriage is driven by means of a single transmission lever only coupled thereto in the proximity of one of the guiding tracks without any danger of tipping inasmuch as all movements transmitted by the transmission lever to one side of the longitudinal carriage are positively transferred by the driving shaft to the other side of the carriage so that the latter is accurately driven in the direction of its guiding tracks.

The transverse carriage directly supporting the film holder is coupled via the transmission means to another control lever for vertical adjustment starting from the level of the horizontal control lever near a wall which is opposite to the wall supporting the film holder. The film holder is preferably accessible from the same wall which supports the screen. The advantage of this arrangement in which all control elements as well as the screen and film gate are located on the same wall of the film reader housing is in the fact that the latter can be supported on any of its sides thus facilitating the adjustment of the most convenient operational position at various working situations.

The transmission means for the transverse sliding carriage includes two Bowden wires connected between the vertical control lever and the transverse sliding carriage to effect the vertical movement of the projected image during its horizontal displacement. In addition, the Bowden wire transmission provides a problem-free motion reversal between the transverse carriage and the vertical control lever so that the transverse carriage moves in counterdirection to the movement of the vertical control lever. As a result when the control lever is moved for example downwardly, the projected image on the screen is also moving downwardly. The combination of a four bar linkage for the horizontal transfer of the movement and of the Bowden wire for the vertical transverse movement insures that the combined movement of the film holder in both axial directions takes place independently in both directions without any interference.

The equalizing lever assigned to the vertical control lever is dimensioned such that the Bowden wires move on a straight line over a major portion of the range of movement of the vertical control lever. In this manner it is achieved that a negligible backlash and an accurate proportionality between the displacement of the vertical control lever and the sliding movement of the film holder take place.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawing:

BRIEF DESCRIPTION OF THE DRAWING

FIG. 3 is a side view of a film holder in connection with its horizontal and vertical guiding means;

FIG. 5 is an exploded view of vertical and horizontal control levers and of its transmission devices and FIG. 6 is a sectional view of vertical guiding means taken along the line VI—VI in FIG. 3.

DESCRIPTION OF THE PREFERRED EMBODIMENTS

Figure 1:
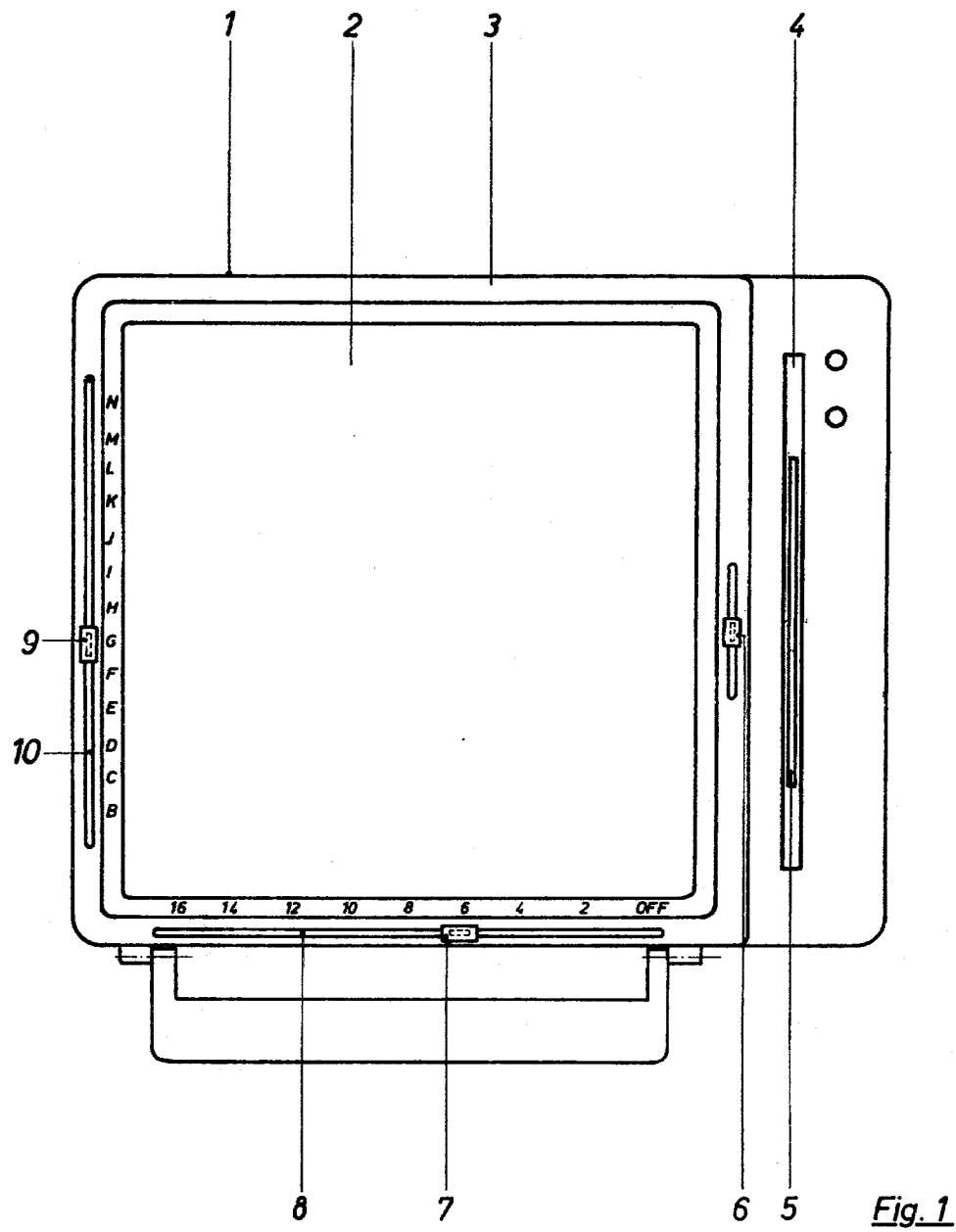
FIG. 1 is a front view of the film reader of this invention.

The film reader illustrated in FIG. 1 has a substantially cubical housing 1 defining on one of its sides a square screen 2 mounted in a front frame 3. A slide-in film capsule 5, as seen on the right hand side of FIG. 1, is insertable into a vertical slot 4 communicating with a vertically and horizontally movable film holder 24. The film capsule 5 containing the film to be projected is carried by the film holder arranged in an illumination plane of a lateral projector. The illumination plane is in register with the slot 4 and the projected image is reflected onto the front screen 2 by conventional means.

A focus control knob 6 is located on the front side of the housing 1 between screen 2 and the slot 4.

As seen in FIG. 1, a horizontal control lever 7 projects from a horizontal slot 8 in the front frame 3 below the screen 2. The slot 8 extends almost over the entire width of the screen 2. A second control lever 9 for adjusting the vertical position of the film projects from a vertical slot 10 formed in the side of the front frame 3 opposite to the vertical slot 4 for the film capsule 5. Also the slot 10 for the vertical control lever 9 extends almost over the entire height of the screen 2. Along respective slots 8 and 10 in the front frame 3 are arranged reference characters and numerals to facilitate the resetting of each projected image from the film.

From FIG. 1 it is apparent that all control element necessary for the operation of the film reader of this invention are located on the front side of the apparatus and consequently the film reader can be operated not only in the position as shown in FIG. 1, but it can be placed on all remaining side surfaces and on the rear surface.

Figure 2:
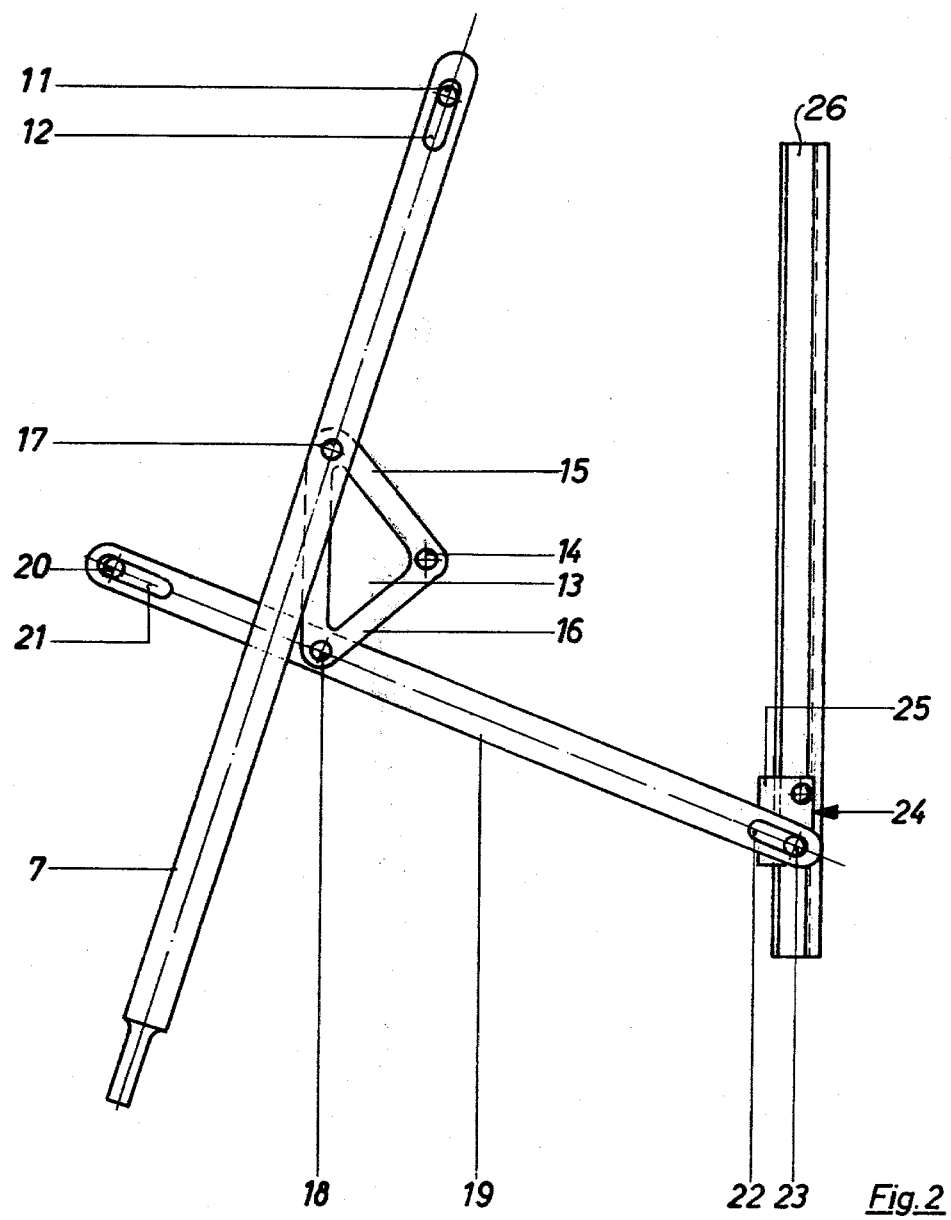
FIG. 2 shows in a bottom view the linkage between a horizontal control lever and a film holder in the reader of this invention.

The film transport along one coordinate axis, in the given example along the axis corresponding to the movement of the horizontal control lever 7, is effected by means of a transmission linkage as illustrated in FIG. 2. The end of horizontal control lever 7 inside the housing 1 is pivotably supported on a fixed pin 11 and at the same time the lever 7 is movable in its longitudinal direction in an oblong slot 12. The pivot pin 11 is located at the rear part of the base plate of housing 1 so that the whole transmission linkage of FIG. 2 is movable in a plane which extends at right angles to the plane of movement of the film capsule 5. The transmission mechanism of FIG. 2 further indicates an equalizing elbow lever 13 having two arms 15 and 16. The apex of the elbow lever 13 is pivotably supported on a fixed pivot axle 14 projecting from the base plate of housing 1.

The end of arm 15 of elbow lever 14 is linked by a hinge joint 17 to the control lever 7, whereas the end of the other arm 16 is linked to a transmission lever 19 by means of a hinge joint 18. The transmission lever 19 extends substantially at right angles to the control lever 7 and is supported at the end thereof remote from the film holder, on a fixed pivot pin 20. Similarly as in the control lever 7, pivot pin 20 guides the transmission lever 19 in an oblong slot 21 extending in the longitudinal direction in the lever 19. Similar guiding slot 22 is provided in the other end portion of the transmission lever and engages in a pin 23 formed on an elongated slide carriage 25 which together with a transverse carriage constitute the film holder 24 for supporting the film capsule 5.

The film holder 24 is illustrated in detail in FIG. 3. The elongated slide carriage 25 is movable on two parallel tracks 26 and 27. Toothed racks 28 and 29 are secured laterally to respective tracks 26 and 27 and are in engagement with pinions 31 and 32 of a driving shaft 30 illustrated by dashed lines in FIG. 3. The driving shaft 30 is supported for rotation on the longitudinal slide carriage 25. One end of the longitudinal slide carriage 25 is provided with the aforementioned pivot pin 23 engaging the oblong slot 22 of transmission lever 19 as illustrated in FIG. 2.

A transverse carriage 33 is supported on drive shaft 30 for movement transverse to the movement of the longitudinal carriage 25. The transverse carriage 33 carries the film capsule 5. The transverse carriage 33 has a projecting pin 34 passing through an elongated guiding slot 35 formed in the longitudinal carriage 25. The central wires 36 and 37 of two Bowden cables 39 and 38 are secured to the guiding pin 34 of the transverse carriage 33 for driving the latter in the transverse direction as it will be explained below in connection with FIG. 4. The cables 39 and 38 are secured to the carriage 25 in a manner shown in FIG. 6.

Figure 4:
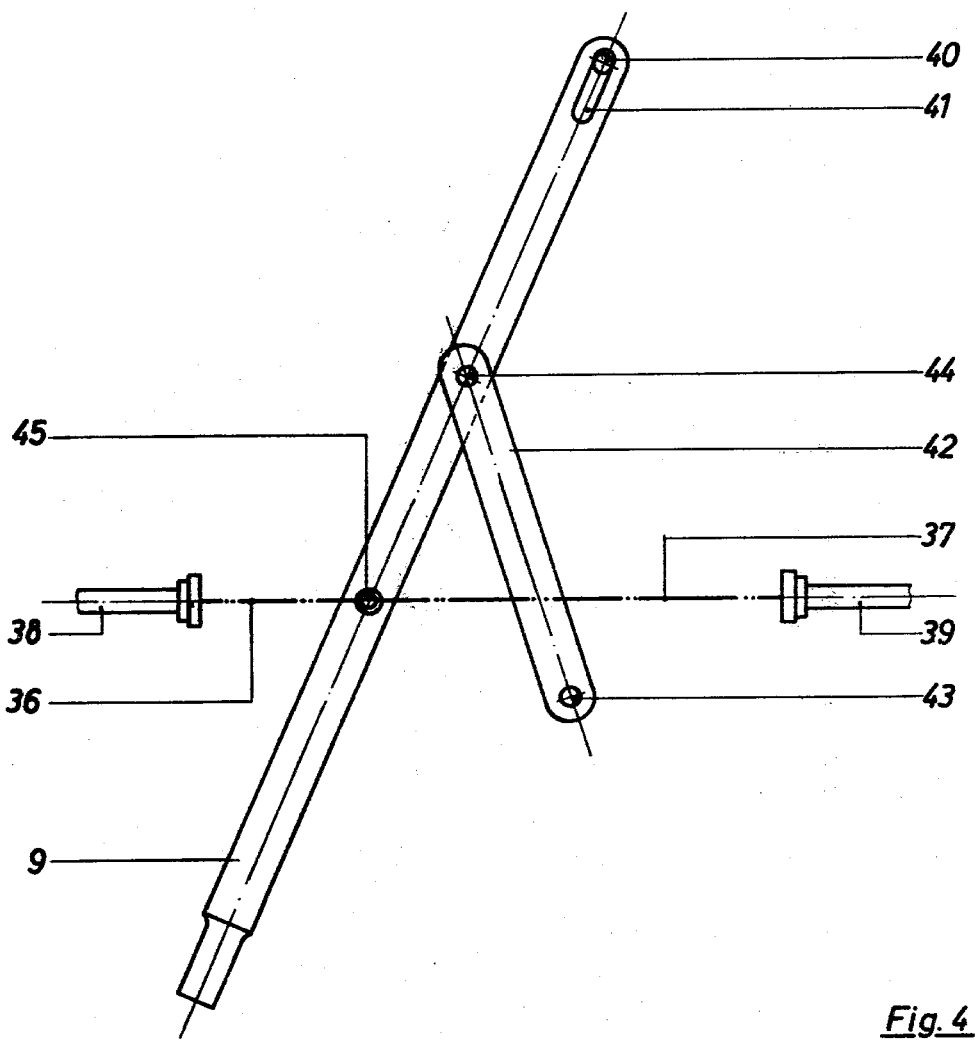
FIG. 4 is a linkage for transmitting the movement of a vertical control lever to the film holder.

FIG. 4 illustrates the transmission mechanism pertaining to the other control lever 9 assigned in the given example for positioning the film along a vertical coordinate axis. The vertical control lever is supported for a pivotal movement in a plane perpendicular to the movement of the lever 7 and similarly as the latter is supported on a fixed pivot pin 40 which engages an oblong slot 41 so that the vertical control lever 9 can perform, apart from its rotary movement, a translational movement in its longitudinal direction. An equalizing one-arm lever 42 is at one end thereof supported for pivotal movement about a fixed pivot pin 43 projecting from a wall of the housing 1. The other end of the lever 42 is hinged to the control lever 9 by means of a hinge joint 44. To equalize the movement of the projecting end of the lever 9 the fixed pivot pin 43 is located closer to the screen than the hinge joint 44.

The other ends of central wires 36 and 37 of Bowden cables 38 and 39 are attached to the vertical control lever 9 by means of attachment screw 45 which is located between the free end of the lever 9 and the hinge joint 44 of the equalizing lever. The length of the equalizing lever 42 and the positions of its pivot points 43 and 44 as well as the position of the fixed pivot pin of the lever 9 are so designed that during the full swing of the vertical control lever 9 the attachment screw 45 moves along a substantially straight line.

The operation of the transmission device in the film reader of this invention will be explained first with reference to FIG. 2 illustrating the displacement of the film holder along one of the coordinate axes by moving the longitudinally slide carriage 25 along the guiding tracks 26 and 27. FIG. 2 shows the film holder 24 in one end position close to the screen 2 and the control lever 7 is in its extreme left hand position. Accordingly, the control lever 7 is movable to the right or pivoted counterclockwise whereby the film holder 24 moves rearwardly along the tracks 26 and 27. The equalizing lever 13 during the movement of control lever 7 is pivoted clockwise about its fixed pivot axis 14 and rotates the transmission lever 19 about its fixed pivot pin counterclockwise whereby the latter moves the film holder 24 in the aforementioned rearward direction. It will be noted that by moving the control lever 7 the latter is first displaced rearwardly in the pin slot guide 11 and 12 and remains in this position approximately up to the middle point of its horizontal sweep whereupon it is again displaced in its longitudinal direction to its original position. As a result of the combined pivotal and rectilinear movements of the control lever 7, the projecting end of the latter extends from the front frame 3 always about the same distance during the whole sweep of the latter.

A corresponding back-and-forth movement of the transmission lever 19 relative to the fixed pivot pin 20 takes place during the movement of the control lever 7. As seen from FIG. 3, the transmission lever 19 is unilaterally attached to the longitudinal slide carriage 25 of the film holder 24. In spite of this unilateral power transmission no canting of the carriage 25 takes place because the driving shaft 30 positively transmits each displacement of the longitudinal carriage 25 from one toothed rack 28 to the other toothed rack 29 and thus simultaneously moves the carriage along the guiding tracks 26 and 27.

Figure 5:
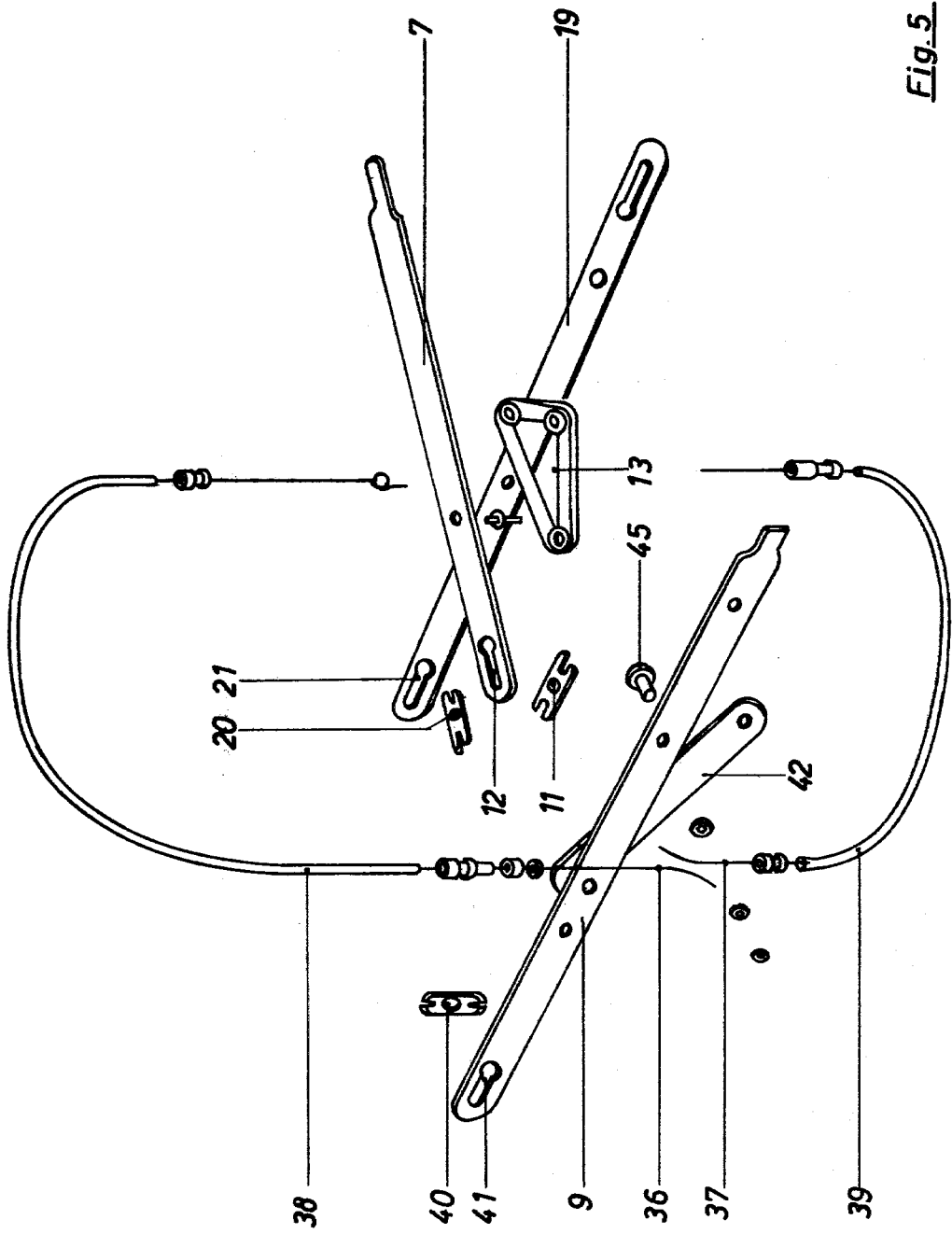

The transverse carriage 33 is driven on the longitudinal carriage 25 by means of the transmission mechanism assigned to control lever 9 as illustrated in FIG. 4. If the control lever 9 is rotated counterclockwise that means in the right-hand direction from the position as illustrated in the Figure, it pulls via the central wire 37 of Bowden cable 39 the transverse carriage 33 to the left (FIG. 3). If the movement of the control lever 9 is reversed, the central wire 37 of Bowden cable 39 displaces the transverse carriage 33 in the longitudinal slot 35 to the right. The whole assembly of the transmission mechanism of this invention is illustrated in FIG. 5. It can be seen that the swinging movement of the vertical control lever 9 is transmitted via Bowden cables 38 and 39 to a non-illustrated transverse slide carriage whereas the sweep of the horizontal control lever 7 is transmitted to the non-illustrated slide carriage by the transmission lever 19.

It will be understood that each of the elements described above, or two or more together, may also find a useful application in other types of constructions differing from the types described above.

While the invention has been illustrated and described as embodied in a specific example of the film reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A film reader including a housing defining a front wall, a rectangular screen arranged in the front wall, a projector having an illumination plane enclosed in said housing, and a film holder accessible through said front wall and being guided in said illumination plane, comprising two control levers movably arranged in said housing and each having a free end portion extending through said front wall, one of said levers being movable alone one edge of said screen and the other lever along a transverse edge of said screen; reversing transmission means linked between said levers and said film holder to move the same at a reduced speed in said illumination plane in direction opposite to the directions of movement of said levers whereby the directions of movement of the film image projected on said screen correspond to those of said levers, said film holder including a longitudinal carriage movable in one direction and a transverse carriage supported on said longitudinal carriage for movement transverse to that of the latter and being adapted for supporting a film to be projected; one of said control levers being rotatable about a fixed pivot point and at the same time guided for longitudinal displacement relative to said fixed pivot point; an equalizing lever hinged to said one control lever and being pivotable about another fixed pivot point; said one control lever being movable in a plane transverse to said illumination plane; said equalization lever being an elbow lever the apex of which is pivotable about said fixed pivot pin; one of the arms of said elbow lever being hinged to said one control lever; said transmission means including a transmission lever extending across said one control lever and being pivotable at one end thereof about a fixed pivot pin and being linked at the other end thereof to a pivot pin on said longitudinal carriage of said film holder; the end portions of said transmission lever including oblong slots engaging respective pivot pins to permit the displacement of said transmission lever along its longitudinal axis; and the other arm of said equalizing elbow lever being hinged to said transmission lever.

2. A film reader including a housing defining a front wall, a rectangular screen arranged in the front wall, a projector having an illumination plane enclosed in the housing, and a film holder accessible through said front wall and being guided in said illumination plane, comprising two control levers movably arranged in said housing and each having a free end portion extending through said front wall, one of said levers being movable along one edge of said screen and the other lever along a transverse edge of said screen; and reversing transmission means linked between said levers and said film holder to move the same at a reduced speed in said illumination plane in directions opposite to the directions of movement of said levers whereby the directions of movement of the film image projected on said screen correspond to those of said levers; said film holder including a longitudinal carriage movable in one direction and a transverse carriage supported on said longitudinal carriage for movement transverse to that of the latter and being adapted for supporting a film to be projected; said transmission means including a pair of guiding tracks for supporting said longitudinal carriage for movement in the direction of one of said axes; a pair of toothed racks assigned to respective guiding tracks; a driving shaft supported for rotation on said longitudinal carriage and having at each end thereof a driving pinion in mesh with said racks; said transmission lever being coupled to said longitudinal carriage in the proximity of one of said racks; said vertical control lever being movable in a guiding slot arranged parallel to the plane of movement of said longitudinal carriage; said transmission means further including a second equalizing lever pivotable in said parallel plane about a fixed pivot point and being hinged to said vertical control lever; a closed loop Bowden cable having its central wire attached at one point to said vertical control lever and at another point to said transverse carriage; the length of said second equalizing lever, the position of said one attachment point of said Bowden cable wire relative to the fixed pivot point and the guiding slot of said vertical control lever being designed such as to guide said Bowden cable wire substantially on a straight line during the movement of said vertical control lever.

* * * * *